Nov. 26, 1963 W. BLUMENTRITT 3,111,813

PELTIER COOLING APPARATUS

Filed Jan. 3, 1962 3 Sheets-Sheet 1

Jnventor:

Wolfram Blumentritt

Nov. 26, 1963
W. BLUMENTRITT
3,111,813
PELTIER COOLING APPARATUS
Filed Jan. 3, 1962
3 Sheets-Sheet 2

Jnventor:
Wolfram Blumentritt

Nov. 26, 1963 W. BLUMENTRITT 3,111,813

PELTIER COOLING APPARATUS

Filed Jan. 3, 1962

3 Sheets-Sheet 3

Jnventor:

Wolfram Blumentritt

United States Patent Office 3,111,813

Patented Nov. 26, 1963

3,111,813
PELTIER COOLING APPARATUS

Wolfram Blumentritt, Berlin-Siemensstadt, Germany, assignor to Siemens-Electrogerate Aktiengesellschaft, Munich, Germany, a corporation of Germany Filed Jan. 3, 1962, Ser. No. 163,975
Claims priority, application Germany Jan. 11, 1961
7 Claims. (Cl. 62—3)

My invention relates to cooling apparatus, such as refrigerators or cold-storage cabinets, in which the cold-producing devices operate on the Peltier principle and consist of batteries or blocks of thermocouples traversed when in operation by electric current to lower in each couple the temperature of one junction (cold junction) relative to the temperature of the other junction (hot junction).

More particularly, my invention concerns a Peltier cooling apparatus in which two blocks of thermoelectric cooling devices of the just-mentioned type are spaced from each other with their respective junction groups of the same temperature range, that is, either the cold-junction groups or the hot-junction groups, facing each other, the intermediate space being occupied by a heat exchanger. Such an apparatus affords subdividing a cooling space into two compartments of respectively different temperatures and also permits doing away with an otherwise required additional heat exchanger because the heat exchanger bordered by the two Peltier blocks simultaneously cooperates with both of them.

Relating to a Peltier cooling apparatus of the above-mentioned type, it is an object of my invention to improve the design and performance of such apparatus by securing a good heat-conducting pressure engagement between the heat exchanger and the adjacent two Peltier blocks, while nevertheless avoiding appreciable heat losses to result from the mechanical connecting means employed for this purpose.

In order to attain a satisfactory thermal and electrical efficiency, a particularly good heat contact between the intermediate heat exchanger and the two Peltier blocks must be provided for. This requires a very firm mechanical connection between the two blocks and the heat exchanger. If the connecting means are designed as mechanical components for pre-stressing the block structures and the heat exchanger, there obtains the danger that these stressing means constitute thermal bridges between structural parts having different respective temperatures during operation. This is the case, for example, if a Peltier block is provided with respective heat exchangers on its two opposite sides, one exchanger providing for heat supply to the block, whereas the other exchanger dissipates heat from the block. Since the elements of the Peltier block or of its individual thermocouples have rather limited mechanical strength, mechanical stressing means for attaching the heat exchangers to the blocks and maintaining a sufficient contact pressure should not be in pressing engagement with the Peltier block itself. For that reason, the tensioning or pre-stressing means must connect hot and cold parts of the assembly. However, in order to prevent an appreciable heat exchange between these hot and cold parts, certain precautionary expedients and devices are necessary. If good insulating materials are employed as mechanical connecting means, the generally slight mechanical strength of these materials does not permit exerting sufficiently great forces upon the parts of the assembly that are to be pre-stressed relative to each other. On the other hand, when using connecting parts of sufficiently great mechanical strength, such as metal components, the heat insulation leaves much to be desired. It is therefore another, more specific object of the invention to minimize or virtually eliminate the heat-insulating problems of a reliable pre-stressing connection of the Peltier-assembly components.

To this end, and in accordance with a feature of the invention, the two Peltier blocks and the intermediate heat-exchanger vessel are tightened and pre-stressed together into mutual good thermal contact by mechanical tie bolts or the like fastening means which have their points of force transmission located at points of the Peltier blocks having approximately the same respective temperatures.

According to another feature of the invention, a particularly favorable Peltier apparatus is obtained by not only providing a heat-exchanger vessel between two Peltier blocks facing the vessel with their heat-receiving sides, but also attaching two heat exchangers at the other heat-issuing sides of the two respective Peltier blocks. In this case, the two Peltier blocks and the three heat exchangers of which the two outer ones constitute the hot sides of the entire assembly are composed to form a single structural unit which is held together by pre-stressing means of which each engages, and extends between, the two outer heat exchangers. In such a unit only such localities are mechanically interconnected by the pre-stressing connecting means, such as tie rods or bolts, which reliably possess approximately the same temperature during operation. Furthermore, with such a three-exchanger unit it is irrelevant whether a heat exchange takes place between the two localities contacted by each of the tensioning or pre-stressing connectors because all of the localities appertain to heat-dissipating zones of the cooling system. For good efficiency of the thermoelectric operation, however, it is only necessary that no heat transmission from the hot to the cold side of the Peltier block takes place. When two outer heat exchangers are interconnected, for example with the aid of tie bolts, all components of the unit can readily be subjected to a clamping pressure sufficient for a good heat contact between the two Peltier blocks and the three heat exchangers. For this purpose, according to a more specific feature of the invention, lugs or bridge pieces are preferably provided to cooperate with the tie bolts or rods for pre-stressing the assembly, these lugs or bridge pieces being preferably designed as integral parts of the two heat exchangers on the hot sides of the respective Peltier blocks. However, separate transverse bridges pieces may also be provided for coaction with the tie members so that in this case no particular means need be provided at the heat exchangers themselves. According to another feature of the invention, a ball or spherical member of steel or the like rigid material may be placed between the above-mentioned bridge piece and the tie members in order to provide for a uniform force distribution onto the individual components of the assembly even in the event the individual tie bolts or other pre-stressing members are non-uniformly tightened.

The foregoing and more specific objects, advantages and features of the invention, said features being set forth with particularity in the claims annexed hereto, will be apparent from, and will be mentioned in, the following with reference to the embodiments of Peltier cooling apparatus according to the invention illustrated by way of example on the accompanying drawings in which:

The same reference numerals are used in all illustrations for the same elements respectively.

Figure 1:
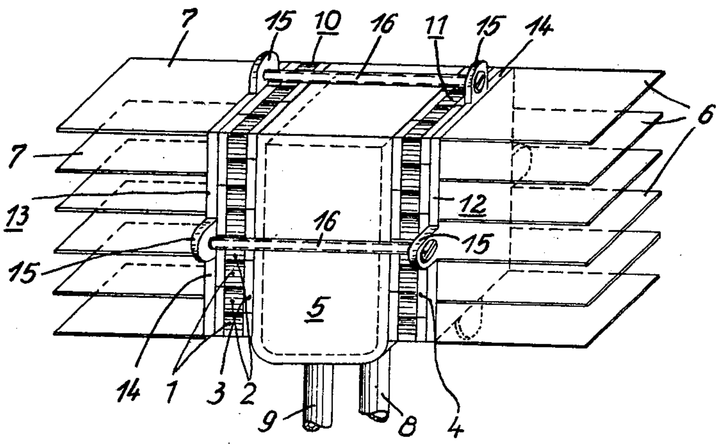
FIG. 1 shows schematically in perspective view a thermoelectric cooling apparatus with two Peltier blocks on opposite sides of a heat-exchanger vessel that forms part of a secondary heat-transfer system, the blocks being provided with fin-type air-cooled heat exchangers on the respective heat-dissipating block sides.
Figure 2:
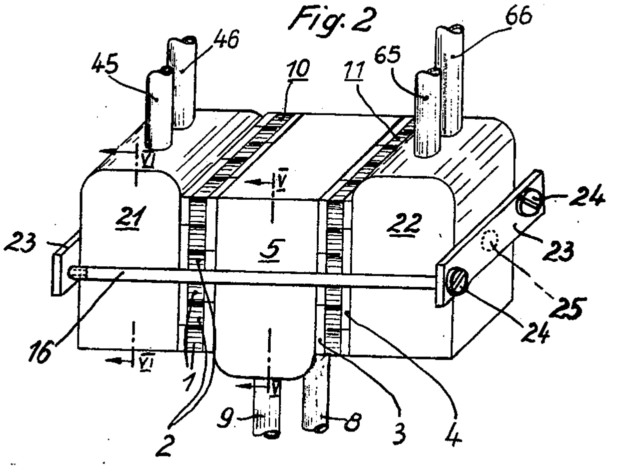
FIG. 2 shows schematically and in perspective another embodiment similar to FIG. 1 but substituting the two fin-type heat exchangers by heat-exchanger vessels for fluid medium to form part of a secondary flow system.
Figure 3:
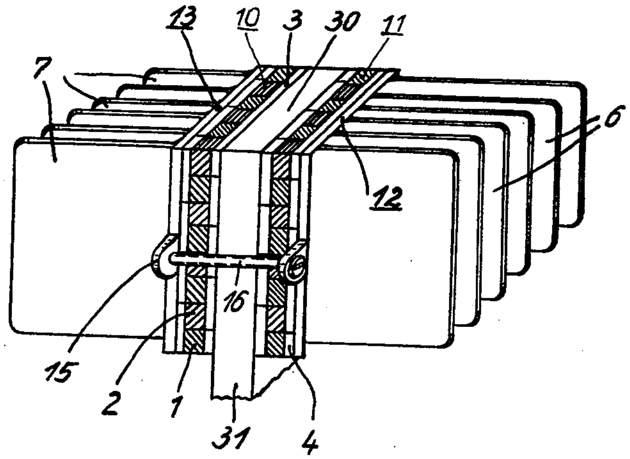
FIG. 3 shows schematically a cooling apparatus in which the heat exchanger between the two Peltier blocks consists of a good heat-conducting metal plate, the apparatus being otherwise similar to that of FIG. 1.
Figure 4:
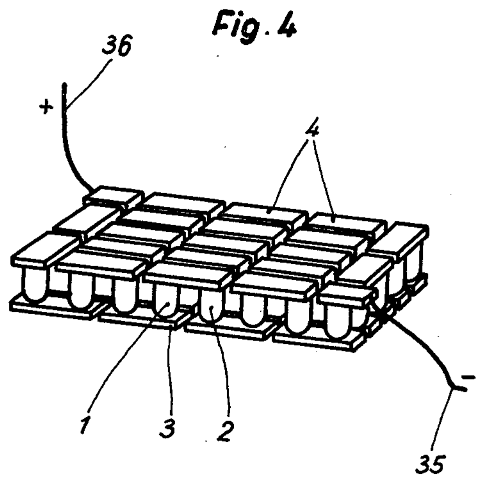
FIG. 4 illustrates in perspective the details of one of the Peltier blocks used in apparatus according to FIGS. 1, 2 and 3.

Each of the cooling apparatus shown in FIGS. 1, 2 and 3 comprises two batteries or blocks 10 and 11 composed of thermocouples as separately shown in FIG. 4. Each individual couple is formed of two thermoelectrically different legs 1 and 2 consisting, for example, of semiconductor material having p-type conductance in one leg and n-type conductance in the other leg. The two legs 1 and 2 of each couple are electrically and thermally connected with each other by a bridge plate 4 of good conducting metal such as copper. Each of the two legs is further connected at the opposite end with the leg of an adjacent thermocouple by a similar bridge plate 3 of good conducting material. In the illustrated embodiment, a large number of such couples are electrically connected in series with each other and the terminal plates of the entire series are provided with electric leads 35 and 36 respectively for passing an electric current through the entire series of thermocouples in order to then produce hot junctions at the plates 4 and cold junctions at the plates 3. The plates 4 have their top surface located in a single plane, and the cold-junction plates 3 have their bottom surface located in a single plane parallel to that of the hot-junction plates. The p-type material for the thermocouples may consist for example of a solid solution of bismuth telluride and antimony telluride. The n-type material for the thermocouple may consist of a solid solution of bismuth telluride and bismuth selenide. The front faces of the couple legs 1 and 2 are made solderable, for example with the aid of ultrasonics, by electroplating with iron, or by vaporizing iron or other solderable metal onto these faces. The coatings then produced are then soldered together with the above-mentioned plates 3 and 4. It will be understood, however, that the particular thermoelectric materials used for the thermocouples are not essential to the invention proper and that various other known substances are available for this purpose. Furthermore, the Peltier blocks may be given an arrangement and design different from the one described above with reference to FIG. 4. With respect to other applicable materials and other designs of Peltier blocks, reference may be had to U.S. Patent No. 2,978,570 or to the copending application of W. Hänlein for Thermoelectric Battery and Method of Its Production, Serial No. 150,701, filed November 7, 1961.

In FIGS. 1, 2 and 3, the two Peltier blocks 10 and 11 extend parallel to each other with the cold-junction plates 3 facing each other. Located between these cold-junction plates 3 is a heat-exchanger vessel 5 which forms part of a secondary system. This system may contain a refrigerant in which the heat, by evaporation and condensation of the refrigerant liquid, is conveyed from the objects to be cooled (see FIG. 5) through connecting lines 8 and 9 to the exchanger vessel 5 which constitutes the condenser in the heat-exchanging system. Mounted on the hot-junction sides of the Peltier blocks 10 and 11 are respective heat exchangers 12 and 13 which are provided with respective groups of fins 6 and 7 for dissipating the heat from the Peltier blocks to the ambient air. The fins are joined with base plates 14 of the respective heat exchangers whose surfaces, facing the Peltier blocks, are covered or coated with a thin electrically insulating layer and are in close contact with the hot sides of the respective Peltier blocks. The two base plates 14 are provided with lugs 15, each protruding outwardly from the middle on each of the four edges of the base plate. Each two mutually opposite lugs 15 of the two heat exchangers 12 and 13 are connected with each other by threaded bolts 16 with the aid of which the components 13, 10, 5, 11 and 12 are firmly pressed against each other. In this embodiment only the hot sides of the Peltier blocks are mechanically connected with each other by the tie bolts 16.

The apparatus shown in FIG. 2 has a design substantially analogous to that of FIG. 1. However, in lieu of the fin-type heat exchangers 12, 13 of FIG. 1, the apparatus of FIG. 2 is provided with respective heat-exchanger vessels 21 and 22. Each of these vessels form a component of a seccondary circulation system containing a liquid coolant to operate with evaporation and condensation of the liquid, the secondary system for vessel 21 being separately illustrated in FIG. 6. The components 21, 10, 5, 11 and 22 are firmly pressed against each other with the aid of bolts 16. The pre-stressing means used in this embodiment comprise two bolts 16 and two transverse bridge pieces 23 cooperating with the bolts. The bolts 16 are shown to have respective heads 24 abutting against one of the transverse pieces 23 and respective threaded portions in engagement with a second transverse bridge 23. The two transverse pieces 23 are in contact only with the respective heat exchanger vessels 21 and 22 located on the hot-junction sides of the Peltier blocks. A heat-bridging connection between the hot and cold sides of the Peltier blocks is thus fully avoided. For distributing the contact pressure uniformly upon the vessels 21 and 22 of the two secondary circulation systems when the transverse bridges 23 are placed under stress by means of the bolts 16, respective balls, for example of steel, are provided between each vessel 21, 22 and the adjacent transverse bridge piece 23. One such ball 25 is indicated in FIG. 2.

The invention is not limited to apparatus of the type in which, according to FIGS. 1 and 2, a secondary circulation system has a heat-exchanger vessel disposed between the two Peltier blocks. The above-mentioned advantages of the invention are rather also realized in apparatus in which the heat exchanger between the two Peltier blocks operates on a different principle. For example, a good heat-conducting metal plate may be located between the two Peltier blocks in order to supply heat to the blocks from the objects to be cooled or to supply heat to components which serve to effect a heat exchange with the environment of the apparatus or refrigerator cabinet.

FIG. 3 illustrates an embodiment of the last-mentioned type. The Peltier blocks 10 and 11 have provided on their two outer sides, possessing the same temperature condition, heat exchangers 12 and 13 of the type described above with reference to FIG. 1. These heat exchangers are equipped with fins or vanes 6 and 7 for heat exchange with the environment. The means 15 and 16 for pre-stressing the assembly and providing the necessary contact pressure correspond to those of FIG. 1. Disposed between the Peltier blocks 10 and 11 is a plate 30 of aluminum of a size larger than the Peltier blocks pressed against the plate. The protruding portion 31, only partially illustrated, of the plate 30 extends to parts of the equipment designed for receiving or issuing heat. The plate 30 is so dimensioned as to offer a slightest feasible resistance to the transfer of the quantity of heat to be transmitted. Disposed between the plate 30 and the adjacent current-conducting bridge plate 3 (FIG. 4) of the Peltier blocks 10 and 11 are respective thin electrically insulating layers or coating which do not constitute an appreciable resistance to the passage of heat.

Figure 5:
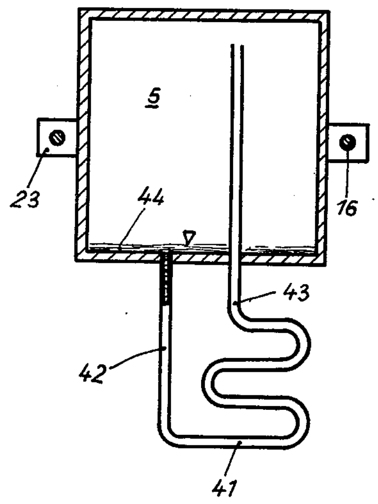
FIG. 5 shows schematically a vertical section along the line V—V in FIG. 2 through the secondary heat exchanger system correlated to the cold-junction side of the two Peltier blocks.

FIG. 5 shows details of the secondary circulatory system employed on the cold side of the Peltier blocks according to FIG. 2. The heat-exchanger vessel 5 on the heat-receiving (cold) side of the Peltier blocks 10 and 11 operates as the condenser for a refrigerant 44, for example Freon 12, in a circulatory system, whose evaporator 41 is connected with the condenser vessel 5 by lines 42 and 43. The refrigerant vapor coming from the evaporator 41 passes through line 43 into the heat-exchanger vessel 5 operating as condenser, where the refrigerant is cooled at the vessel walls that are in heat-conducting connection with the Peltier blocks 10 and 11. On these lateral walls, the refrigerant vapor is cooled and condensed to convert to the liquid state. The liquid refrigerant then flows through line 42 back to the evaporator 41 which is located in the cooling chamber proper of a refrigerator cabinet or other chamber. The components of the secondary circulation system, particularly the condenser vessel 5 and the evaporator 41, are made of good heat-conducting material, for example copper or aluminum. The circulation lines 42 and 43 must be pressure-tightly joined with the walls of the vessel 5. The materials employed are therefore preferably chosen so that they can be welded together or can be joined together by hard-soldering.

Figure 6:
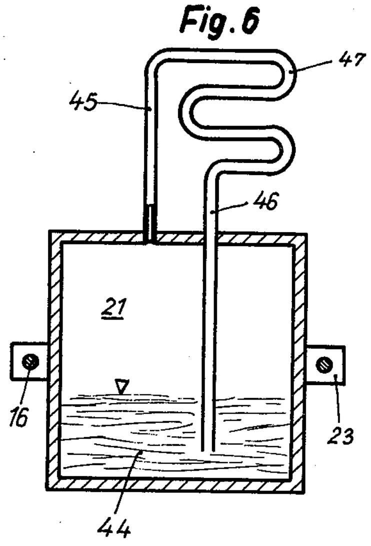
FIG. 6 shows schematically a vertical section corresponding to FIG. 5 but extending along the line VI—VI in FIG. 2, the section relating to one of the secondary systems on the hot-junction side of one of the Peltier blocks.

FIG. 6 shows details of the secondary circulation system employed on the hot sides of the Peltier blocks according to FIG. 2. The systems to which the vessels 21 and 22 in FIG. 2 appertain have an identical design so that it suffices to illustrate only one of these systems in FIG. 6. In principle, this system is similar to that employed on the cold side of the Peltier block, the only difference residing in the direction of the refrigerant circulation. The description of materials given above with reference to FIG. 5 thus also applies to the details of the system described presently with reference to FIG. 6.

The heat-exchanger vessel 21 on the hot side of the Peltier block 10 constitutes the evaporator of a heat-exchanger system whose condenser 47 is connected with the evaporator by circulation lines 45 and 46. The refrigerant vapor coming from the evaporator 21 rises through the line 45 to the condenser 47 where it condenses along the portions where the condenser is in heat exchange with the ambient air, whereafter the liquefied refrigerant returns through line 46 to the evaporator 21.

Figure 7:
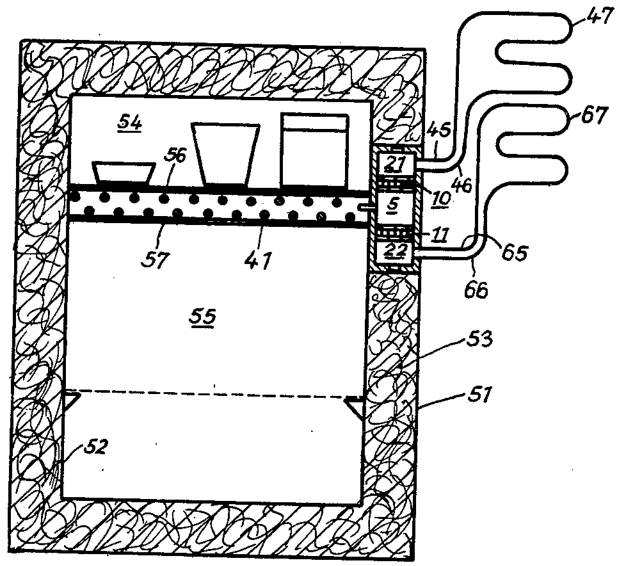
FIG. 7 shows schematically a vertical section through a refrigerator cabinet equipped with a thermoelectric cooling apparatus according to FIGS. 2, 4, 5 and 6.

FIG. 7 shows at 51 the outer shell of the refrigerator cabinet. The inner shell is denoted by 52, and the intermediate heat-insulating material, such as glass, wool, by 53. The cabinet is subdivided into two compartments 54 and 55. The upper compartment 54 has a smaller height than the lower compartment and serves for containing a lower temperature or freezing temperature, whereas the lower compartment provides normal cooling temperature. Two Peltier blocks 10 and 11 are provided for cooling the two compartments. The cold-junction sides of both blocks face each other. Located between these two cold sides is the condenser 5 of a heat-exchanger system of the circulatory type operating with evaporation and condensation of the refrigerant liquid as explained above. The block and condenser arrangement for FIG. 7 corresponds to that described above with reference to FIGS. 2, 5 and 6. Lines 8 and 9 extend from the condenser 5 to an evaporator 41 in form of a winding which is covered upwardly and downwardly by cover sheets 56 and 57. The partition thus formed separates the two compartments 54 and 55 from each other. The hot-junction sides of the blocks 10 and 11 are in heat-exchanging connection with the vessels 21 and 22 which both operate as evaporators. These vessels are connected by circulatory lines 45, 46 and 65, 66 with respective condensers 47 and 67 mounted on the outside of the cabinet in order to be cooled by ambient air. The thermoelectric cooling unit, comprising the vessels 21, 22, 5 and the Peltier blocks 10 and 11, is mounted in a recess between the outer and inner sheet-metal shelves 51 and 52 of the cabinet structure at a height corresponding to that of the partition which separates the two compartments 54 and 55.

It will be obvious to those skilled in the art, upon studying this disclosure, that the invention is amenable to a variety of modifications with respect to individual components and arrangement of the Peltier apparatus and hence can be given embodiments other than particularly illustrated and described herein, without departing from the essential features of the invention and within the scope of the claims annexed hereto.

I claim:

1. A thermoelectric cooling apparatus, comprising two Peltier blocks having respective junction groups of the same temperature range facing each other, a fluid circulation system having a heat exchanger vessel mounted between said two groups of junctions and having fluid flow lines extending away from said vessel, two heat-exchange structures in thermally conductive contact with said respective other junction groups of said Peltier blocks, and mechanical stress means interconnecting said two structures so as to maintain pressure contact of said two blocks with said vessel and said two structures, said stress means being mechanically spaced from said two blocks and including a plurality of peripherally-spaced outwardly extending lugs mounted on each outer heat-exchange structure at locations of equal temperature as well as a plurality of bolts connecting the lugs on one structure to the lugs on the other.

2. A thermoelectric cooling apparatus, comprising two Peltier blocks each composed of a multiplicity of electrically series-connected thermocouples and having all hot junctions on one side of the block and all cold junctions on the opposite side, said two blocks extending parallel and in spaced relation to each other with the respective cold-junction sides facing each other, three heat exchangers having respective heat exchanger structures of which one is located between said two blocks in heat conductive relation to said two cold-junction sides and the other two structures are located on the respective hot-junction sides of said two blocks, and a plurality of mechanical tie means extending between said two other heat exchanger structures and clamping said two blocks and said three structures together to maintain heat conducting contact therebetween, said tie means being clear of said two Peltier blocks and including a plurality of peripherally-spaced outwardly extending lugs mounted on each outer heat-exchange structure at locations of equal temperature as well as a plurality of bolts connecting the lugs on one structure to the lugs on the other.

3. In cooling apparatus according to claim 2, said two outer heat exchanger structures consisting of vessels and having coolant circulation lines extending from said vessels, said tie means comprising a transverse bridge piece extending across each of said respective vessels at the vessel side away from said blocks, and tie rods of which each extends between said bridge pieces.

4. A cooling apparatus according to claim 3, comprising a ball member between each of said bridge pieces and the adjacent one of said vessels for uniform distribution of forces from said tie rods onto said vessels.

5. A thermoelectric cooling apparatus comprising two Peltier blocks having respective junction groups of the same temperature range facing each other, heat-exchange means sandwiched between said blocks in a thermally conductive heat-exchange structure, mechanical means forming with said blocks and said heat-exchange means a structural unity and including a plurality of peripherally-spaced outwardly extending lugs mounted on each heat-exchange structure at locations of equal temperature as well as a plurality of bolts connecting the lugs on one structure to the lugs on the other.

6. A thermoelectric cooling apparatus comprising two Peltier blocks having respective junction groups of the same temperature range facing each other, heat-exchange means sandwiched between said blocks in a thermally conductive heat-exchange structure, mechanical means forming with said blocks and said heat-exchange means a structural unity and including a plurality of peripherally-spaced outwardly extending lugs mounted on each heat-exchange structure at locations of equal temperature as well as a plurality of bolts connecting the lugs on one structure to the lugs on the other, said heat-exchange means and structures having dimensions at the surfaces where they contact the blocks corresponding to at least some of the dimensions of the blocks at their contact surfaces, so that virtually only the lugs extend beyond the blocks and the bolts are spaced from the blocks and heat-exchange means.

7. A thermoelectric cooling apparatus comprising two Peltier blocks having respective junction groups of the same temperature range facing each other, heat-exchange means sandwiched between said blocks in a thermally conductive heat-exchange structure, mechanical means forming with said blocks and said heat-exchange means a structural unity and including a plurality of peripherally-spaced outwardly extending lugs mounted on each heat-exchange structure at locations of equal temperature as well as a plurality of bolts connecting the lugs on one structure to the lugs on the other, said heat-exchange means and structures having dimensions at the surfaces where they contact the blocks corresponding to at least some of the dimensions of the blocks at their contact surfaces, so that virtually only the lugs extend beyond the blocks and the bolts are spaced from the blocks and heat-exchange means, said lugs being integral with said structures.

References Cited in the file of this patent

UNITED STATES PATENTS

| | | |
|---|---|---|
| 2,289,152 | Telkes | July 7, 1942 |
| 2,947,150 | Roeder | Aug. 2, 1960 |
| 2,992,538 | Poganski | July 18, 1961 |
| 3,035,416 | Wagner | May 22, 1962 |